US008255334B2

(12) United States Patent
Meyer et al.

(10) Patent No.: US 8,255,334 B2
(45) **Date of Patent: *Aug. 28, 2012**

(54) METHOD FOR PROVIDING POSTAL ITEMS WITH POSTAL PREPAYMENT IMPRESSIONS

(75) Inventors: Bernd Meyer, Königswinter (DE); Jürgen Lang, Bergisch Gladbach (DE)

(73) Assignee: Deutsche Post AG (DE)

( * ) Notice: Subject to any disclaimer, the term of this patent is extended or adjusted under 35 U.S.C. 154(b) by 1916 days.

This patent is subject to a terminal disclaimer.

(21) Appl. No.: 10/258,227

(22) PCT Filed: Apr. 24, 2001

(86) PCT No.: PCT/DE01/01555

§ 371 (c)(1),
(2), (4) Date: Nov. 19, 2002

(87) PCT Pub. No.: WO01/82233

PCT Pub. Date: Nov. 1, 2001

(65) Prior Publication Data

US 2004/0028233 A1 Feb. 12, 2004

(30) Foreign Application Priority Data

Apr. 27, 2000 (DE) .................................. 100 20 566

(51) Int. Cl.
*G06Q 20/00* (2006.01)
*G06F 17/00* (2006.01)

(52) U.S. Cl. .......................................... 705/60; 705/401

(58) Field of Classification Search .................. 705/401, 705/60; 380/277

See application file for complete search history.

(56) References Cited

U.S. PATENT DOCUMENTS

| | | | | |
|---|---|---|---|---|
| 4,376,299 | A | 3/1983 | Rivest | 364/900 |
| 5,142,577 | A * | 8/1992 | Pastor | 705/62 |
| 5,666,421 | A | 9/1997 | Pastor et al. | 380/51 |
| 5,801,364 | A * | 9/1998 | Kara et al. | 235/375 |
| 5,982,896 | A | 11/1999 | Cordery et al. | |
| 6,005,945 | A * | 12/1999 | Whitehouse | 380/51 |
| 6,209,093 | B1 * | 3/2001 | Venkatesan et al. | 713/176 |
| 6,438,530 | B1 * | 8/2002 | Heiden et al. | 705/401 |
| 6,847,951 | B1 * | 1/2005 | Cordery et al. | 705/60 |
| 2004/0059680 | A1 * | 3/2004 | Lang et al. | 223/37 |

FOREIGN PATENT DOCUMENTS

DE 31 26785 7/1980

(Continued)

OTHER PUBLICATIONS

Applied Cryptography, Bruce Schneier, 1996.*

(Continued)

*Primary Examiner* — Calvin L Hewitt, II
*Assistant Examiner* — Zeshan Qayyum
(74) *Attorney, Agent, or Firm* — Connolly Bove Lodge & Hutz

(57) ABSTRACT

The invention relates to a method for providing postal items with postal prepayment impressions, characterized in that data are generated in the customer system that are encrypted in such a manner that the value transfer center is able to decrypt them. To this end, the data are transmitted from the customer system to the value transfer center. The value transfer center then decrypts the data and re-encrypts them with a code not known to the customer system and transmits the encrypted data to the customer system.

13 Claims, 4 Drawing Sheets

The fundamental cycle of PC franking

FOREIGN PATENT DOCUMENTS

Figure 1:
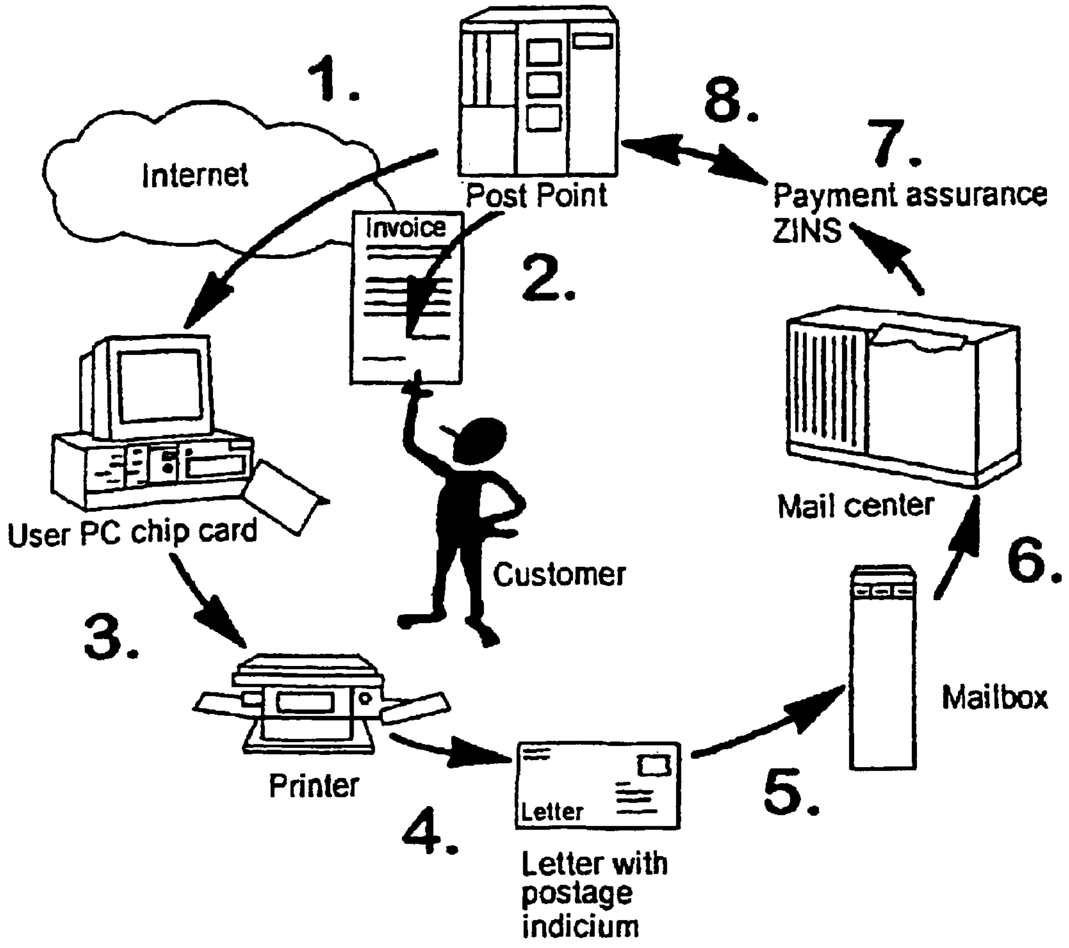

| | | | |
|---|---|---|---|
| EP | 0 376 573 | | 12/1989 |
| EP | 0 550 226 | | 12/1992 |
| EP | 0 854 446 | | 12/1997 |
| EP | 0 782 108 | A3 | 1/2000 |
| EP | 0 331 352 | B2 | 7/2002 |
| WO | WO 98/14907 | | 4/1998 |
| WO | WO 98/57302 | | 12/1998 |
| WO | WO 99/16023 | | 4/1999 |
| WO | WO 99/48053 | | 9/1999 |

OTHER PUBLICATIONS

Smid et al., "The Data Encryption Standard: Past and Future", *Proceedings of the IEEE*, vol. 76, No. 5, pp. 550-559, May 1988.

"Information Based Indicia Program Postal Security Device Specification", Jun. 13, 1996, XP-002137734.

* cited by examiner

The fundamental cycle of PC franking

METHOD FOR PROVIDING POSTAL ITEMS WITH POSTAL PREPAYMENT IMPRESSIONS

The invention relates to a method for providing mailpieces with postage indicia, whereby a customer system loads a monetary amount from a value transfer center via a data line, whereby the customer system controls the printing of postage indicia onto mailpieces and whereby the value transfer center transmits a data packet to the customer system.

A method of this generic type is known from international patent application WO 98 14907.

Another method is known from German Patent No. DE 31 26785 C1. With this method, a reloading signal intended for the franking of mailpieces is generated in a separate area of a value transfer center operated by a postal service provider.

The invention is based on the objective of creating a method for applying postage to letters that is suitable for applying postage to individual letters as well as for applying postage to bulk mail.

According to the invention, this objective is achieved in that data is generated in the customer system and encrypted in such a manner that the value transfer center is able to decrypt this data, in that the data is transmitted from the customer system to the value transfer center and in that the value transfer center decrypts the data and then re-encrypts the data with a key that is not known to the customer system and subsequently transmits the data thus encrypted to the customer system.

The customer system is preferably configured in such a way that it is not capable of completely decrypting data transmitted by the value transfer center, but a mail center in which the mailpieces are checked for correct franking, however, can decrypt this data.

The value transfer center can be configured in various ways. The term value transfer center encompasses known value transfer centers as well as new forms of value transfer centers.

The invention relates especially to those value transfer centers that can be directly accessed via a data communication line such as the Internet or telephone lines of connected data servers.

An advantageous embodiment of the method, a preferred configuration of the customer system and of the value transfer center are characterized in that the encryption takes place in the customer system using a random number.

It is advantageous for the random number to be generated in a security module to which a user of the customer system has no access.

A preferred embodiment of the method, a preferred configuration of the customer system and of the value transfer center are characterized in that the random number is encrypted together with a session key issued by the value transfer center and with a public key of the value transfer center.

It is advantageous for the customer system to sign the data with a private key.

An advantageous embodiment of the method, a preferred configuration of the customer system and of the value transfer center are characterized in that the private key is stored in the security module.

It is advantageous for the data to be transmitted from the customer system to the value transfer center at the time of each request for a monetary amount.

An advantageous embodiment of the method, a preferred configuration of the customer system and of the value transfer center are characterized in that the value transfer center identifies the customer system on the basis of the transmitted data.

It is advantageous for the value transfer center to transmit the data it has encrypted to the customer system.

An advantageous embodiment of the method, a preferred configuration of the customer system and of the value transfer center are characterized in that the data transmitted by the value transfer center to the customer system has a first component that cannot be decrypted by the customer system and in that the data also has a second component that can be decrypted by the customer system.

It is advantageous for the part of the data that can be decrypted by the customer system to contain information about the identity of the customer system.

An advantageous embodiment of the method, a preferred configuration of the customer system and of the value transfer center are characterized in that the part of the data that can be decrypted by the customer system contains information about the actual monetary amount.

It is advantageous for a transmission of data from the customer system to the value transfer center to only take place when a minimum amount is to be loaded into the customer system.

An advantageous embodiment of the method, a preferred configuration of the customer system and of the value transfer center are characterized in that a hash value is formed in the customer system.

It is advantageous for the hash value to be formed with the inclusion of information about mailing data.

An advantageous embodiment of the method, a preferred configuration of the customer system and of the value transfer center are characterized in that the hash value is formed with the inclusion of a temporarily stored random number.

It is advantageous for the hash value to be formed with the inclusion of a loading procedure identification number.

An advantageous embodiment of the method, a preferred configuration of the customer system and of the value transfer center are characterized in that the postage indicium contains logical data.

It is advantageous for the postage indicium to contain information about mailing data.

An advantageous embodiment of the method, a preferred configuration of the customer system and of the value transfer center are characterized in that the logical data contains information about the encrypted random number.

It is advantageous for the logical data to contain information about the encrypted loading procedure identification number.

An advantageous embodiment of the method, a preferred configuration of the customer system and of the value transfer center are characterized in that the logical data contains information about the hash value.

An advantageous embodiment of the method, a preferred configuration of the customer system and of the value transfer center are characterized in that the postage indicium contains information transmitted by the value transfer center as well as data entered by the document producer.

It is advantageous to carry out the method or to configure the customer system or the value transfer center in such a way that the postage indicium contains a hash value that is formed on the basis of a combination of a value transmitted by the specification center and of values entered by the document producer.

An advantageous embodiment of the method, a preferred configuration of the customer system and of the value transfer center are characterized in that they comprise the following process steps: in the customer system or in a security module connected to the customer system, a secret is generated and subsequently transmitted to the value transfer center, together with information about the identity of the document producer and/or of the customer system he/she is using.

It is advantageous to carry out the method or to configure the customer system or the value transfer center in such a way that the value transfer center decrypts the encrypted random number and then re-encrypts it again in such a way that only the mail center can decrypt it and subsequently, the value transfer center generates a loading procedure identification number.

An advantageous embodiment of the method, a preferred configuration of the customer system and of the value transfer center are character in that the encrypted random number enters into the generation of the loading procedure identification number.

It is advantageous to carry out the method or to configure the customer system or the value transfer center in such a way that the loading procedure identification number is transmitted to the security module.

An advantageous embodiment of the method, a preferred configuration of the customer system and of the value transfer center are characterized in that, in the security module, a hash value is formed on the basis of the loading procedure identification number and additional data.

It is advantageous to carry out the method or to configure the customer system or the value transfer center in such a way that the postage indicium is created so as to contain the hash value.

An advantageous embodiment of the method, a preferred configuration of the customer system and of the value transfer center are characterized in that the validity of postage indicia is verified in the mail center.

It is advantageous to carry out the method or to configure the customer system or the value transfer center in such a way that the verification in the mail center is performed by an analysis of data contained in the postage indicium.

An advantageous embodiment of the method, a preferred configuration of the customer system and of the value transfer center are characterized in that the verification station forms a hash value on the basis of data contained in the postage indicium and checks whether this hash value matches a hash value contained in the postage indicium and, if it does not match, then the postage indicium is registered as being forged.

Additional advantages, special features and advantageous refinements of the invention ensue from the representation below of a preferred embodiment with reference to the drawings.

Figure 2:
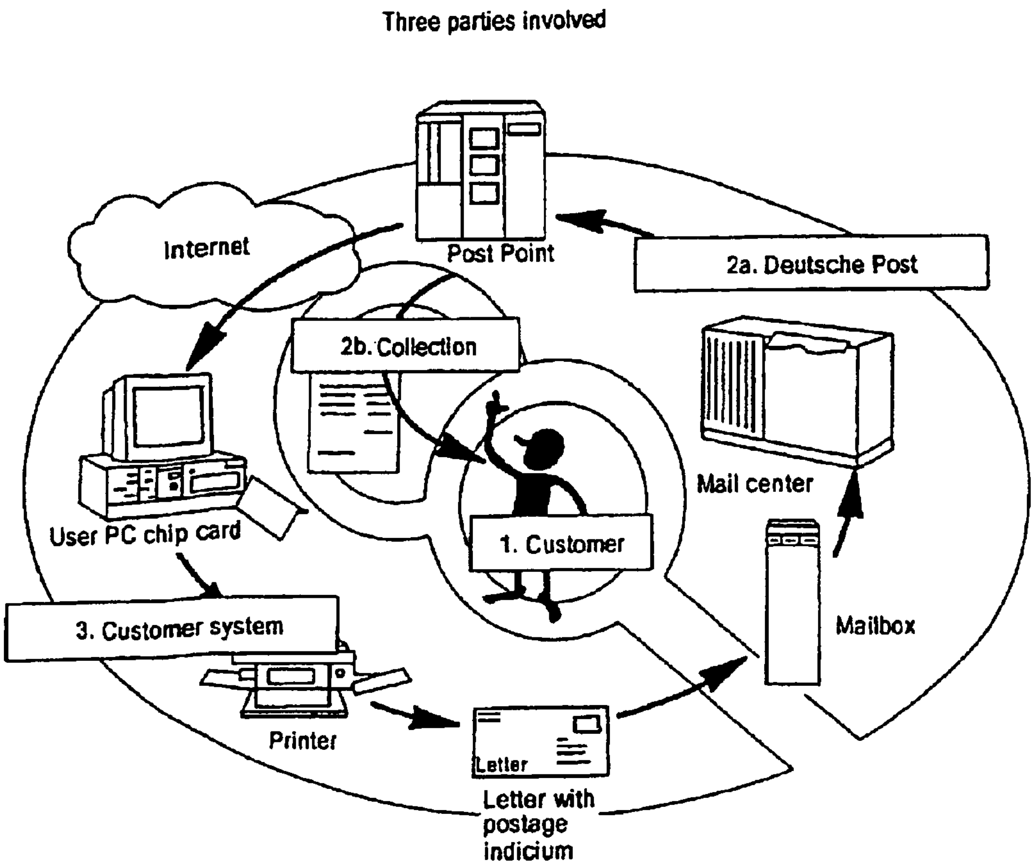
Figure 3:
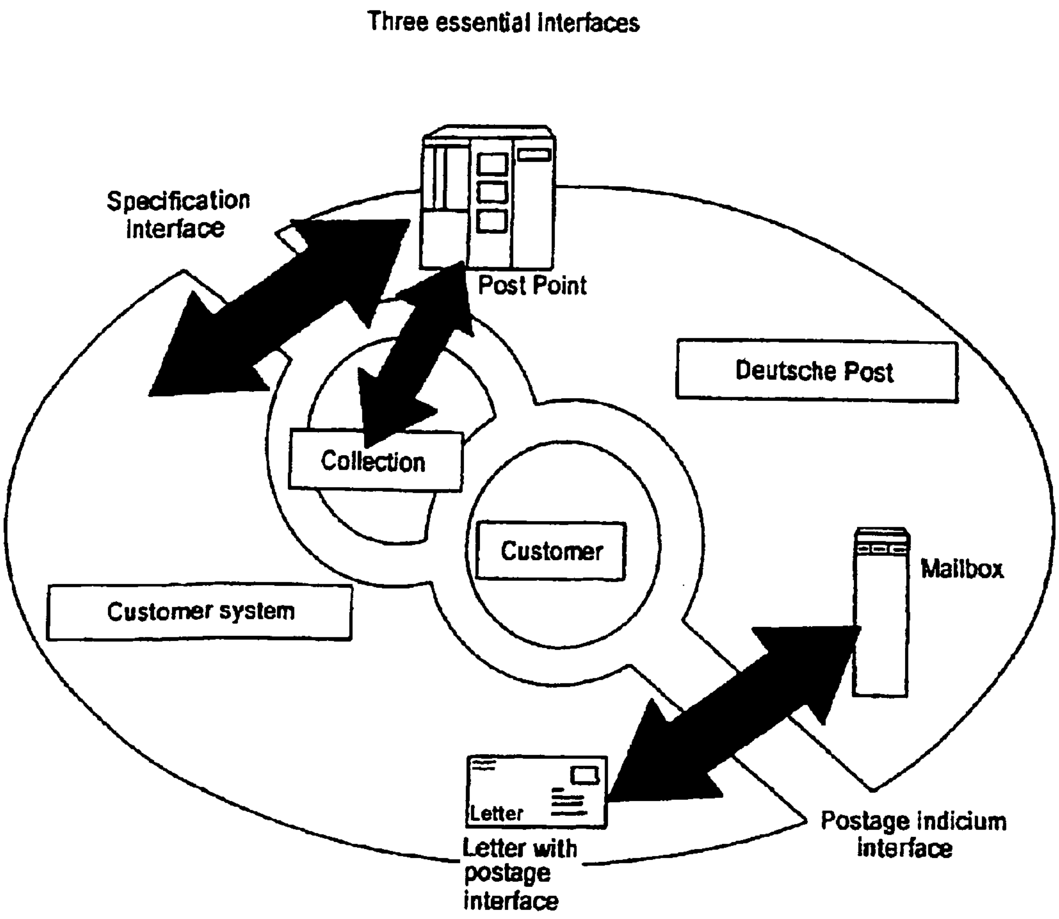
Figure 4:
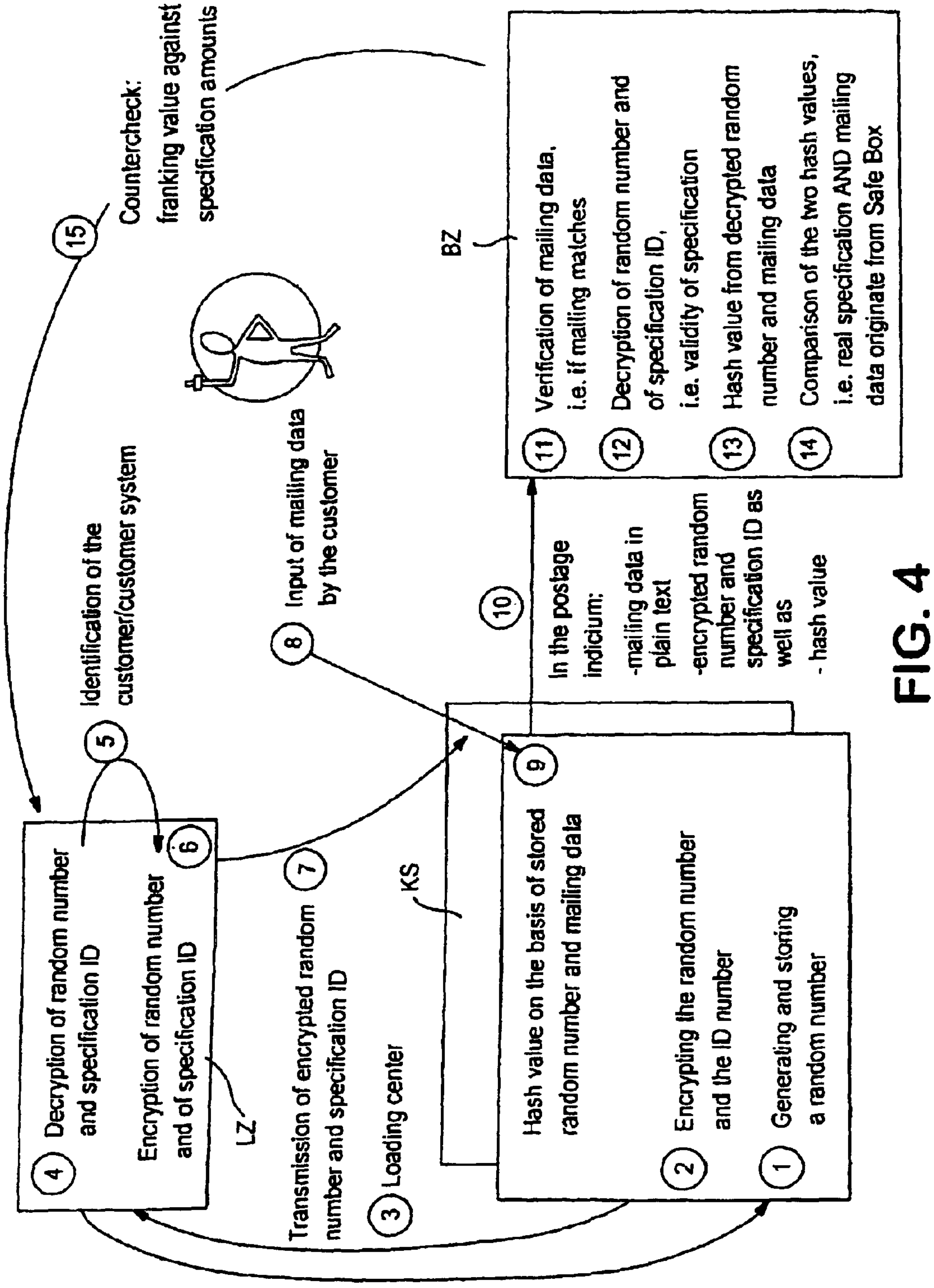

The drawings show the following:

FIG. 1—a schematic diagram of a method according to the invention,

FIG. 2—the schematic diagram shown in FIG. 1 with emphasis on the parties involved in a franking procedure, FIG. 3—interfaces of the franking system shown in FIGS. 1 and 2, and FIG. 4—a schematic diagram of security mechanisms used in the method.

The following embodiment describes the invention with reference to an envisaged use in the realm of the Deutsche Post AG. However, it is, of course, equally well possible to use the invention for franking other documents, especially for use in the realm of other service providers.

The invention provides a practicable new form of franking with which customers can use a conventional PC with a printer and additional software and optionally hardware as well as Internet access to print "digital postage indicia" on letters, postcards, etc.

The customer can pay for the value of the printed-out postage indicia in various ways. For example, a stored credit can be correspondingly reduced. This credit is preferably stored digitally. Digital storage is effectuated, for example, on a special customer card, on a standardized bank card or in a virtual memory that is located, for instance, in a computer of the user. Preferably, the amount of credit is loaded before postage indicia are printed out. In an especially preferred embodiment, the amount of credit is loaded by means of a direct-debit procedure.

FIG. 1 shows a fundamental sequence of applying postage according to the invention to mailpieces. The method comprises several steps that can preferably be complemented to form a complete cycle. Although this is very advantageous, it is not necessary. The number of steps, namely eight, presented below is similarly advantageous, but likewise not necessary.

1. With a PC, customers of the postal service provider (optionally using additional software/hardware, for example, a microprocessor chip card) load a value amount via the Internet.
2. A collection procedure is carried out on the value amount, for example, by debiting the account of the customer.
3. Valid postage values in any desired amount can be printed out from the value amount that is stored in an electronic purse of the customer via his/her own printer until the credit is used up.
4. The postage indicium printed by the customer contains readable information as well as a machine-readable bar code that is used by the Deutsche Post to verify the validity.
5. The mailpiece to which postage has been applied can be dropped off via the modalities offered by the Deutsche Post, for example, mailboxes and post office branches.
6. The bar code indicated in the postage indicium, preferably a 2D bar code, is read in the mail center by means of an address reading machine. During the processing, the validity is verified on a logical plausibility basis.
7. The data read from the postage indicium is transmitted, among other things, for purposes of payment assurance, to a background system.
8. A comparison is made between the loaded account amounts and the processed mailings in order to detect misuse.

Preferably, several parties are involved in the franking procedure, whereby an especially advantageous breakdown of the parties is shown in FIG. 2.

The parties shown are a customer, a customer system and a postal service provider.

The customer system comprises the hardware and software used by the customer for the PC franking. The customer system interacts with the customer to regulate the loading and storing of the account amounts. Details pertaining to the customer system regulate the approval prerequisites.

The postal service provider carries out the processing of the mailings and performs the necessary payment assurance. A value transfer center can be configured in various ways.

The operation of one's own value transfer center, in conjunction with the security architecture of the PC franking, allows the use of symmetrical encryption procedures in the postage indicium. As a result, the requisite verification time of the validity of a postage indicium is considerably reduced. A prerequisite for the use of a symmetrical procedure is the operation of the value transfer center and of the mail centers by the same organization. Such an accelerated processing would not be possible if asymmetrical security elements were used in the postage indicium.

Realization of all necessary security requirements, among other things, in order to avoid internal and external manipulations:

Unlike with application of postage by the sender, the communication takes place via the open and potentially non-secure Internet. Attacks on the communication paths and on the Internet server as well as internal possibilities of manipulation call for higher security precautions. These are primarily in the interest of the Deutsche Post and its customers.

An improvement of the security is possible through a central management of cryptographic keys specified by the postal service provider. The keys that are relevant for the processing in the mail center can be replaced at any time by the Deutsche Post and the key lengths can be changed.

Verifications for purposes of payment assurance are possible by means of a uniform verification procedure and can be carried out at any time.

New contractual participants and amendments to agreements can be quickly communicated to all necessary systems of the postal service provider.

Payment assurance is preferably carried out by compiling components of the postage indicia.

For this purpose, agreement data (customer/customer system data) is transmitted from a central database to the system that is needed for the verification of the proper payment assurance.

The scope of the data to be stored is determined by the postal service provider, especially the operator of the postal service, taking into account the statutory regulations such as the German Postal Service Provider Data Protection Regulations (Postdienstunternehmensdatenschutzverordnung—PDSV). Fundamentally, these regulations state that all data may be stored that is needed for the proper determination, accounting and evaluation as well as for the verification of the accuracy of retrospective payments. As a matter of principle, this constitutes all mailing information without the name of the recipient and optionally the street number or P.O. Box of the recipient.

A background system checks whether the monetary amounts present in the customer system are, in fact, reduced by the monetary amounts that are printed out as postage indicia.

Compiling agreement data is preferably effectuated by a compilation system.

Agreement data for PC franking with the individual master data of the customer and of the customer system (e.g. security module ID) is provided and maintained by a database that can be used, for example, for other types of postage application. When an existing postage application database is used, for example, a separate partial area is used for PC franking in the database. The data is provided to the value transfer center and to the system for payment assurance in the mail center.

It is especially advantageous for the system to comprise interfaces that allow a data and information exchange with other systems.

FIG. 3 shows three interfaces.

The interfaces are designated with "postage indicium" and "collection". Account data is exchanged between the customer system and the postal service provider via the account interface. For example, a sum of money can be loaded via the account interface.

The franking interface determines how postage indicia will be configured so that they can be read and verified in mail or freight centers.

In the implementation of the interfaces shown in FIG. 3, the accounting interfaces and the collection interface are separate from each other. However, it is likewise possible for the accounting interface and the collection interface to be combined, for example, in the case of accounting via bank cards, credit cards or digital money, especially digital coins. The collection interface determines how the monetary amounts transmitted via the accounting interface will be invoiced. The other parameters of the franking method do not depend on the selected collection interface but an efficient collection interface increases the efficiency of the entire system. Preferred collection modalities are direct debits and invoices.

Below, there will be a presentation of how the security objectives of the franking method are achieved through application-specific, content-based security requirements.

The focus of this concept is aimed here at the technical specification of the security requirements made of the system. Processes that are not security-relevant such as registering, canceling and re-registering customers, which do not have to be carried out via the customer system, can be specified separately. Technical processes between the customer system and the customer system producer are preferably specified in such a way that they meet the security standard described here.

The following security objectives are achieved by the method according to the invention.

Fantasy markings and smears, that is to say, postage indicia that contain no plausible information about the mailing or that are unreadable for other reasons, are recognized as being invalid.

Duplicates, that is to say, exact copies of valid postage indicia with plausible information about the mailing can be recognized retrospectively.

An increase in the amount of credit available to the customer system is prevented. Changes in the amount of credit can also be recognized retrospectively and can also be substantiated retrospectively, preferably with reference to a journal list.

Unauthorized uses are recognized and, in case of unauthorized use by third parties, are not charged to the legitimate user.

This also includes the misuse of properly transmitted electronic data or valid postage indicia that were properly generated without the knowledge of the legitimate user.

This includes the misuse of the customer system through program changes.

This includes the unauthorized use of the customer system by foreign software agents via the Internet.

This includes the acquisition of PINs by means of attack software (Trojan horses).

This includes overload attacks (Denial-of-Service Attacks, DoS), for example, by simulating the identity of the value transfer center or manipulating the loading procedure in such a way that money is debited but no credit is augmented.

Unauthorized loading of account amounts is made impossible through technical precautions in the value transfer center. Unauthorized loading of account amounts could take place, for example, through:

Simulating the identity of the postal value transfer center so that the customer can increase his/her own purse in the customer system.

Simulating a certified customer system by a manipulated or fictitious customer system in such a way that the perpetrator acquires knowledge about security-critical secrets of the security module and can then surreptitiously create forgeries.

Intercepting the legitimate communication between a customer system and the value transfer center and replaying this communication with fraudulent intent (replay attack).

Manipulation of the communication taking place between the customer system and the value transfer center in real time (incoming and outgoing data streams in the customer system) in such a way that the customer system assumes a higher loaded value amount than the value transfer center does.

Misuse of customer identification numbers in such a way that third parties load value amounts at the expense of a customer.

Incomplete cancellation transactions.

The first two of these security problems are essentially solved by the system concept and through measures in the overall system; the latter three are preferably solved by the implementation of software and hardware of the security module.

Preferred embodiments of hardware that enhance the security standard are described below:

Fundamental properties of the hardware

1. All encryptions, decryptions, re-encryptions, signature computations and cryptographic verification procedures are carried out in areas of a cryptographic security module in the customer system that are specially protected against unauthorized access. The appertaining keys are likewise stored in such security areas.
2. Security-relevant data and sequences (for example, keys, programs) arm protected against unauthorized changes and secret data (for example, keys, PINs) is protected against unauthorized reading. This is preferably effectuated by the following measures:
   - the design of the security module, possibly interacting with security mechanisms of the software of the security module,
   - loading programs into the security module only when the loading procedure is being established or cryptographically secured,
   - cryptographic securing of the loading of security-relevant data, especially of cryptographic keys.
   - Secret data in security modules also has to be protected against being read out by means of attacks that entail the destruction of the module.

a. The protection of data and programs against change or against being read out in the security module has to be so effective that, during the service life of the module, attacks involving a reasonable effort are not possible, taking into account the fact that the effort for a successful attack has to be weighed against the benefit that can be derived from this.

b. It must Lot be possible to carry out undesired functions by means of a security module.

Undesired auxiliary functions and additional data channels, especially interfaces, that unintentionally pass on information (side channels) are prevented.

Through the design of the security module, it is ensured that an attacker cannot use interfaces that are intended for other purposes to read out information about data and keys, which are to be kept secret.

The presence of such channels of, namely, side channels, is checked by appropriate tests. Typical possibilities that are checked are:

1. Single Power Attack (SPA) and Differential Power Attack (DPA), which attempt to deduce secret data from changes in the power consumption during cryptographic computations.
2. Timing Attacks that attempt to deduce secret data from the duration of cryptographic computations.

Preferred properties of the data processing are presented below:

Sequence control:

It is especially advantageous for a sequence control to be carried out. This can be done, for example, by means of a state machine, for example, in accordance with Standard FIPS PUB 140-1. This ensures that the sequences of the specified transactions and the security-relevant data of the system used for this purpose cannot be manipulated.

The involved entities, especially the user, must not be misled by a security module about the sequences of the transactions.

If, for example, the procedure of loading a value amount is carried out in the form of several partial procedures with individual call instructions of the security module, then the sequence control must ensure that these partial procedures are only carried out in the permissible order.

The status data that is used for the sequence control is security-relevant and is therefore preferably stored in an area of the security module that is secured against manipulation.

Message integrity:

1. All security-relevant information in the messages is protected against unauthorized changes before and after being transmitted into the components of the system.
2. Changes to security-relevant information during the transfer between components of the chip-card-aided payment system are recognized. Appropriate reactions to integrity breaches must be generated.
3. The unauthorized importing of messages is recognized. Appropriate reactions to re-imported messages must also be generated.

The fact that unauthorized changes and the re-importing of messages can be recognized is ensured for the standard messages of the system by the definitions of the system concept. The software of the security module must ensure that the recognition does indeed occur and that the appropriate reaction is generated. For security-relevant, producer-specific messages (for example, within the scope of personalizing the maintenance of the security module), appropriate suitable mechanisms are specified and employed.

The information relevant for securing the message integrity is preferably stored in an area of the security module that is secured against manipulation. Such information includes especially identification and authenticity features, sequence counters or monetary amounts.

Secrecy of PINs and cryptographic keys

1. Although the PIN should not be transmitted in plain text outside of secured areas, preferably the plain-text transmission during PC franking is tolerated for reasons of the user-friendliness of the entire system and the use of existing, unsecured hardware components in the customer system (keyboard, monitor). However, the local system components in which the PINs are processed or stored in plain text should be kept to a minimum. An unsecured transmission of the PINs must not take place.
2. Cryptographic keys must never be transmitted in plain text via electronic transmission paths in an unsecured environment. If they are used or stored in system components, then they must be protected against unauthorized reading out and modification.

3. No system component must offer a possibility to determine a PIN on the basis of an exhaustive search.

Recording in a journal

1. Within the customer system, all data is recorded that is needed for the reconstruction of the appertaining sequences. Moreover, error cases that arouse a suspicion of manipulation are also recorded.
2. Stored journal data must be protected against unauthorized changes and it must be possible to transfer it authentically to an evaluating entity.

Processing of other uses

If other applications are concurrently processed in security modules, then this must not compromise the security of the PC franking system.

The following measures can further enhance the data security:

Deletion of secret data from temporary memory media

Secure implementation of producer-specific functions (e.g., within the scope of personalization); for instance, the use of Triple-DES or a secure symmetrical process for encrypting secret personalization data, incorporation of plain text keys in the form of divided secrets (e.g. key halves) according to the four-eye principle No non-secure auxiliary functions may exist (for example, encrypting or decrypting or signing of freely selectable data with keys of the system); no switching of the function of keys must be possible.

Additional Aspects

Aside from the security modules used in the customer systems, other security modules also have to be examined: in particular, the security modules of the various certification stations (CAs) of the producers of security modules have to be examined.

The PC-related part of the customer software also has to be examined in terms of its security-relevant tasks (e.g. PIN input).

The producer of a customer system must provide a process that guarantees the secured transmission of the PIN from security modules to the users (for example, PIN letter mailing). The security of and compliance with such a concept must be examined.

Security of the producer environment, especially key incorporation, etc.; security officer, more general: approval of the organizational security measures of producers according to a specified process. In particular:

Key management

1. Arrangements have to be put in place pertaining to the distribution, administration and possibly regular change and replacement of keys.
2. Keys that are suspected of having been compromised must not be used anywhere in the entire system.

Preferred measures in the production and personalization of security modules are:

1. The production and personalization (initial incorporation of secret keys, possibly user-specific data) of security modules have to take place in a production environment that prevents keys from being compromised during the personalization, the personalization procedure from being carried out fraudulently or without authorization, unauthorized software or data from being incorporated, security modules from being removed.

2. It must be ensured that no unauthorized components that perform security-relevant functions can be introduced into the system.
3. The life cycle of all security modules has to be continuously recorded.

Explanation:

The recording of the life cycle of a security module comprises:

production and personalization data, location in time and space, repair and maintenance, shutdown, loss or theft of the data storage media containing the security module such as files, dongles, crypto, servers or chip cards production and personalization data, introduction of new applications, change in applications, change in keys, shutdown, loss or theft.

Security Architecture

For the PC franking, a fundamental security architecture is provided that combines the advantages of various existing approaches and that offers a high level of security with simple means.

The security architecture preferably comprises essentially three units that are shown in a preferred arrangement in FIG. 4:

A value transfer center in which the identity of the customer and his/her customer system are known.

A security module which, as hardware/software that cannot be manipulated by the customer, ensures the security in the customer system (e.g. dongle or chip card with off-line solutions or equivalent server with on-line solutions).

A mail center where the validity of the postage indicia is checked or where manipulations to the value amount as well as to the postage indicium are recognized.

The individual process steps that are carried out in the value transfer center, customer system and mail center will be shown below in the form of a schematic diagram. The precise technical communication process, however, diverges from this schematic diagram (e.g. several communication steps to achieve a transmission shown here). In particular, in this depiction, the confidentiality and integrity of the communication between the identified and authenticated communication partners is a prerequisite.

Customer System

1. Within the security module, a random number that the customer does not come to know is generated and temporarily stored.
2. Within the security module, the random number is combined and encrypted together with an unambiguous identification number (security module ID) of the customer system, or of the security module, in such a way that only the value transfer center is capable of performing a decryption.

In an especially preferred embodiment, the random number, together with a session key previously issued by the value transfer center and with the utilization data of the communication (request for establishing an account amount), is encrypted with the public key of the value transfer center and is digitally signed with the private key of the security module. This prevents the request from having the same form each time an account amount is loaded and from being able to be used for the fraudulent loading of account amounts (replay attack).
3. The cryptographically handled information from the customer system is transmitted to the value transfer center within the scope of loading an account amount. Neither the customer nor third parties can decrypt this formation.

In actual practice, use is made of asymmetrical encryption with the public key of the communication partner (value transfer center or security module).

Along with the possibility of a preceding exchange of keys, another option is a symmetrical encryption.

Value Transfer Center

4. In the value transfer center, among other things, the random number that can be assigned to the identification number of the security module (security module ID) is decrypted.
5. Through a request in the postage application database, the security module ID is assigned to a customer of the Deutsche Post.
6. In the value transfer center, a loading procedure identification number is formed that contains parts of the security module ID, the actual account amount, etc. The decrypted random number is encrypted together with the loading procedure identification number in such a way that only the mail center is capable of performing a decryption. The customer, on the other hand, is not capable of decrypting this information. (The loading procedure identification number is additionally encrypted in a form that can be decrypted by the customer system). In actual practice, the encryption is carried out with a symmetrical key according to TDES which is exclusively present in the value transfer center as well as in the mail centers. Symmetrical encryption is used here because of the demand for fast decryption procedures during the processing.
7. The encrypted random number and the encrypted loading procedure identification number are transmitted to the customer system. Neither the customer nor third parties can decrypt this information. Through the general administration of the postal service provider's own, preferably symmetrical, key in the value transfer center and in the mail centers, the key can be exchanged at any time and key lengths can be changed as needed. This is a simple way to ensure a high level of security against manipulation. In actual practice, the loading procedure identification number is additionally made available to the customer in a non-encrypted form.

Customer System

8. Within the scope of creating a postage indicium, the customer compiles the mailing-specific information or mailing data (e.g. value of postage, postal class, etc.) that are transmitted into the security module.
9. Within the security module, a hash value is formed, among other things, on the basis of the following information
   - excerpts from the mailing data (e.g. value of postage, postal class, date, postal code, etc.),
   - the temporarily stored random number (which was generated within the scope of the loading of an account amount)
   - and optionally the loading procedure identification number.
10. The following data, among other things, is integrated into the postage indicium:
    - excerpts from the mailing data in plain text (e.g. value of postage, postal class, date, postal code, etc.),
    - the encrypted random number and the encrypted loading procedure identification number from the value transfer center and
    - the hash value formed within the security module on the basis of the mailing data, of the random number and of the loading procedure identification number.

Mail Center

11. In the mail center, firstly, the mailing data is checked. If the mailing data integrated into the postage indicium does not match the mailing, then this is either a fraudulent franking or else a fantasy marking or smear. The mailing has to be sent over to the payment assurance system.
12. In the mail center, the random number and the loading procedure identification number, which were transmitted to the customer system within the framework of with the account amount are decrypted. For this purpose, only one single (symmetrical) key is needed in the mail center. If individual keys were used, however, a plurality of keys would have to be used.
13. In the mail center, a hash value is formed by means of the same process on the basis of the following information:
    - excerpts from the mailing data,
    - the decrypted random number,
    - the decrypted loading procedure identification number.
14. In the mail center, the self-generated and the transmitted hash value are compared. If they both match, then the transmitted hash value was formed with the same random number that was also transmitted to the value transfer center within the scope of loading the account amount. Consequently, this is a real, valid account amount as well as mailing data that was communicated to the security module (validity verification). As far as the effort is concerned, the decryption, the formation of a hash value and the comparison of two hash values is theoretically the same as that of a signature verification. However, due to the symmetrical decryption, there is a time advantage over the signature verification.
15. Anomalies between loaded account amounts and franking amounts can be ascertained retrospectively by means of a countercheck in the background system (verification in terms of mailing duplicates, balance formation in the background system).

The fundamental security architecture presented does not comprise the separately secured administration of the account amounts (purse function), the security of the communication between the customer system and the value transfer center, the mutual identification of the customer system and of the value transfer center, and the initialization for the secure start-up of a new customer system.

Attacks on the Security Architecture

The described security architecture is secure against attacks through the following:

- Third parties cannot use the intercepted (copied) successful communication between a customer system and the value transfer center for fraudulent purposes (replay attacks).
- Third parties or customers cannot simulate a legitimate customer system vis-à-vis the value transfer center by using a manipulated customer system. If a third party or a customer replicates the transmission of a random number and of a safe-box ID that were not generated within a security module but that he/she knows, then the loading of the account amounts will fail either because of the separately executed identification of the legitimate customer through user name and password, or else because of the knowledge of the private key of the security module, which the customer may never know under any circumstances. (This is why the initialization process for key generation in the security module and the certification of the public key have to be properly carried out by the customer system provider.)
- Third parties or customers cannot load valid account amounts into a customer system using a simulated value transfer center. If a third party or a customer replicates the functionality of the value transfer center, then this replicated value transfer center will not succeed in generating an encrypted loading procedure identification number that can be properly decrypted in the mail center.

Moreover, the certificate of the public key of the value transfer center cannot be forged.

Customers cannot circumvent the value transfer center in order to create a postage indicium whose loading procedure identification number is encrypted in such a way that it could be decrypted in the mail center as being valid.

In order to increase data security, especially during searching, an exhaustive number of random numbers have to be used for forming the hash value.

Therefore, the length of the random number should be as large as possible, preferably at least 16 bytes (128 bits).

The security architecture employed is superior to the prior art methods, thanks to the possibility of using customer-specific keys, without it being necessary to keep keys ready in places intended for decryption, especially in mail centers. This advantageous embodiment is fundamentally different from the known systems according to the Information-Based Indicia Program (IBIP).

If no signature verification is carried out like in the IBIP model, then not much more security would be achieved than with postage metering by the sender. Moreover, if the fact becomes known that the digital signatures are not verified, this could lead to increased misuse. After all, if all of the information that is used for the plausibility verification is forged with the intention of fraud, but without adding a valid signature, then this misuse cannot be recognized, even if it is widespread, except when spot checks are carried out.

Advantages of the Security Architecture

The following features characterize the described security architecture in comparison to the IBIP model from the United States:

The actual security is ensured in the systems of the Deutsche Post (value transfer center, mail center, payment assurance system) and is thus completely within the sphere of influence of the Deutsche Post.

No signatures are used in the postage indicium, but rather technically equivalent and equally secure (symmetrically) encrypted data and hash values are used. For this purpose, in the simplest case, only a symmetrical key is used that is exclusively within the sphere of influence of the Deutsche Post and that is thus easy to replace.

In the mail center, a verification of all of the postage indicia features is possible (instead of on the basis of spot checks).

The security concept is based on a simple inherently closed verification cycle that matches a background system harmonized with this.

The system recognizes even duplicates, which can otherwise hardly be detected.

Invalid fantasy markings can be recognized with great accuracy using this method.

In addition to the plausibility check, with all of the postage indicia, the loading procedure identification number can be checked in real time.

Types of Mailing

With PC franking, all of the products of the mailing service provider such as, for example, "national letter" (including extra services) and "national direct marketing" can be franked by the mailing service provider according to a preceding stipulation.

By the same token, this method can be used for other shipping forms such as package and express shipments.

The maximum monetary amount that can be loaded via the value transfer center is set at an appropriate level. The amount can be selected depending on the requirement of the customer and on the security needs of the postal service provider. Whereas a monetary amount of several hundred German marks at the maximum is especially advantageous for use by private customers, large-scale customers require far higher monetary amounts. An amount in the range of about 500 German marks is suitable for high-volume private households as well as for free-lancers and small businesses. From a system-related technical standpoint, the value stored in the purse should preferably not exceed twice the value amount.

Incorrectly Franked Mailings

Letters, envelopes, etc. that have already been printed and that are incorrectly franked are credited back to the customer in the form of a valid postage indicium.

Through suitable measures, for example, by stamping mailpieces as they arrive at the mail center, it is possible to ascertain whether a mailpiece has already been delivered. This prevents customers from getting already delivered mailpieces back from the recipient and from submitting them to the postal service provider, for example, Deutsche Post AG in order to obtain a refund.

The return to a central place of the postal service provider, for example, Deutsche Post, allows a high degree of payment assurance through a comparison of the data with account amounts and this provides knowledge about the most frequent reasons for returns. This might offer the possibility of fine-tuning by changing the entry prerequisites with the objective of reducing the return rates.

Validity of Postage Indicia

For purposes of payment assurance, account amounts purchased by the customer are valid, for example, for only three months. An indication to this effect should be included in the agreement with the customer. If franking values cannot be used up within 3 months, then the customer system has to contact the value transfer center for a renewed creation of postage indicia. During this contact, like with the proper loading of account amounts, the remaining amount of an old account amount is added to a newly issued account amount and made available to the customer under a new loading procedure identification number.

Special Operational Handling

Fundamentally, the postage indicia can have any desired form in which the information contained therein can be reproduced. However, it is advantageous to configure the postage indicia in such a way that they have the form of bar codes, at least in certain areas. With the presented solution of the 2D bar code and the resultant payment assurance, the following special features must be taken into account during the processing:

PC-franked mailpieces can be dropped off via all drop-off modalities, also via mailboxes.

Compliance with the described security measures is further enhanced by specifying the approval prerequisites for producers of components of the franking system that are relevant for the interfaces, especially for the producers and/or operators of customer systems.

Governing Norms, Standards and Requirements

International Postage Meter Approval Requirements (IPMAR)

Preferably, the regulations in the most recent version of the document titled International Postage Meter Approval Requirements (IPMAR), UPU S-30, is applicable as are all norms and standards to which this document makes reference. Compliance with all of the requirements listed there, to the extent possible, is recommended for the customer system.

Digital Postage Marks: Applications, Security & Design

Fundamentally, the regulations of the current version of the document titled Digital Postage Marks: Applications, Security & Design (UPU: Technical Standards Manual) is applicable as are all norms and standards to which this document makes reference. Compliance with the “normative” content as well as far-reaching observation of the “informative” content of this document, to the extent possible, is recommended for the customer system.

Preferably, rules and regulations of the postal service provider are likewise applicable.

The data security and the reliability of the system as well as its user-friendliness are ensured by approving only those systems that fulfill all of the statutory regulations as well as all of the norms and standards of the postal service provider.

Additional Laws, Rules, Regulations, Guidelines, Norms and Standards

Fundamentally, all laws, rules, regulations, guidelines, norms and standards in their currently valid version that must be observed for the development and operation of a technical customer system in the actual execution are applicable.

Technical System Interoperability

Technical system interoperability relates to the functionality of the interfaces of the customer system, or to the compliance with the specifications set forth in the interface descriptions.

Accounting Interface

Communication Path, Protocols

The communication via the accounting interface preferably takes place via the public Internet or the basis of the TCP/IP and HTTP protocols. The data exchange can optionally be encrypted per HTTP via SSL (https). The target process of a necessary transmission is depicted here.

To the extent possible, the data exchange preferably takes place via HTML-coded and XML-coded files. The text and graphic contents of the HTML pages should be displayed in the customer system.

In the case of communication pages, it seems advisable to turn to a well-established HTML version and to dispense with the use of frames, embedded objects (Applets, ActiveX, etc.) and optionally animated GIFs.

Sign-On to Load an Account Amount (First Transmission from the Security Module to the Value Transfer Center)

Within the scope of the first transmission from the security module to the value transfer center, the certificate of the security module as well as an action indicator A are transmitted in non-encrypted and unsigned form.

Acknowledgement of the Sign-On (First Response from the Value Transfer Center to the Security Module)

The acknowledgement of the value transfer center contains the value transfer center’s own certificate, an encrypted session key and the digital signature of the encrypted session key.

Second Transmission from the Security Module to the Value Transfer Center

Within the scope of this transmission, the security module transmits the newly encrypted session key, the encrypted random number and the encrypted data record with utilization data (level of a previously loaded account amount, remaining value of the current account amount, ascending register of all account amounts, last loading procedure identification number) to the value transfer center (all asymmetrically encrypted with the public key of the value transfer center). At the same time, the security module transmits the digital signature of this encrypted data to the value transfer center. Simultaneously, the customer system can transmit additional, non-encrypted and unsigned utilization journals or utilization profiles to the value transfer center.

It is advantageous for the utilization data to be entered into a utilization journal and for the utilization journal and/or the entries recorded therein to be digitally signed.

Second Response from the Value Transfer Center to the Security Module

The value transfer center transmits the symmetrically encrypted random number and the symmetrically encrypted loading procedure identification number to the security module. Moreover, the value transfer center transmits to the security module the loading procedure identification number, log-in information for the security module as well as a new session key, which have been encrypted with the public key of the security module. All of the transmitted data is also digitally signed.

Third Transmission from the Security Module to the Value Transfer Center

Within the scope of the third transmission, the security module transmits the new session key, the new loading procedure identification number together with utilization data to confirm successful communication, all in encrypted and digitally signed form, to the value transfer center.

Third Response from the Value Transfer Center to the Security Module

In the third response, the value transfer center acknowledges the success of the transmission without the use of cryptographic methods.

De-Installation

The option of de-installation of the customer system by the customer must be possible.

The detailed technical description of the accounting interface is presented with the concept of the postal authority’s own value transfer center.

Utilization Journal and Utilization Profile

In the customer system, within the scope of each generation of a postage indicium, a journal entry has to be generated that must contain all information about each postage indicium—provided with a digital signature of the security module. Moreover, each error status of the security module has to be recorded in the journal in such a way that the manual deletion of this entry is noticed during the verification procedure.

The utilization profile contains a prepared summary of the utilization data since the last communication with the value transfer center.

If a customer system is divided into a component located at the premises of the customer as well as a central component (e.g. in the Internet), then the utilization profile has to be maintained in the central component.

Postage Indicium Interface

Components and Execution

The customer system has to be capable of creating PC indicia that correspond precisely to the specifications of the Deutsche Post, or to the framework of the commonly used CEN and UPU standards.

PC indicia preferably consist of the following three elements;

- A two-dimensional line code, bar code or matrix code, in which mailing-specific information is depicted in machine-readable form. (Purpose: automation in the processing and in the payment assurance system of the Deutsche Post.)
- Plain text showing important parts of the bar code information in readable form. (Purpose: control option for the customer in the processing and in the payment assurance system of the Deutsche Post.)

A logo identifying the postal service provider, for example, the Deutsche Post such as, for example, the typical coach horn of the German Postal System.

Specification of the Data Content

Advantageously, the bar code and the plain text of the PC postage indicium contain the following information:

TABLE

Content of the PC postage indicium

| | | In bar code | In plain text | Size (bytes) | Type | Remark |
|---|---|---|---|---|---|---|
| 1 | Postal service provider | yes | No | 3 | Binary | e.g. Deutsche Post |
| 2 | Type of mailing | Yes | No | 1 | Binary | e.g. PC franking |
| 3 | Version and price/product version | Yes | No | 1 | Binary | |
| 4 | Crypto-algorithm ID | Yes | No | 1 | Binary | e.g. TIDES, 128 bit |
| 5 | Loading procedure identification number (encrypted) producer model serial no. consecutive specification amount currency valid until redundancy | Yes | | 16 | Binary | |
| 6 | Random number (encrypted) | Yes | No | 16 | Binary | |
| 7 | Consecutive mailing no. | Yes | Yes | 3 | Binary | Relative to the security module |
| 8a | Type of product | Yes | Yes | 2 | Binary | Including additional services-in plain text only for types of mailing at reduced rates (e.g. information letter) |
| 8b | Mailing form | No | Yes | — | Binary | Type of mailing or special mailing form |
| 9 | Payment | Yes | Yes | 2 | Binary | Plain text in ASCII |
| 10 | Franking date | Yes | Yes | 3 | Binary | |
| 11 | Postal code of the recipient | Yes | No | 3 | Binary | |
| 12 | Street/P.O. box of the recipient | Yes | No | 6 | ASCII | First and last three items of the address |
| 13 | Remaining value of the value amount | Yes | No | 3 | Binary | |
| 14 | Hash value | Yes | No | 20 | Binary | SHA-1 |

Only the content of the postage indicium is described here. The requirements of the postal service provider retain their validity for the content of the address data.

Specification of the Physical Appearance on Paper (Layout)

The postage indicium is advantageously applied in the address field so as to be left-aligned above the address on the mailpiece.

The address field is specified in most recent valid version of the standards of the postal service provider. In this manner, the following postage indicia are made possible:

imprint on the envelope imprint on adhesive labels or use of window envelopes in such a way that the imprint on the letter is completely visible through the window.

The following preferably applies to the individual elements of the postage indicium:

Firstly, the bar code of the data matrix type is used; its individual pixels should have an edge length of at least 0.5 mm.

In view of the reading-related technical prerequisites, it is preferable to use a 2D bar code in the form of the data matrix with a minimum pixel size of 0.5 mm. An optionally advantageous option is to reduce the pixel size to 0.3 mm.

With a representation size of 0.5 mm per pixel, the edge length of the entire bar code is about 18 mm to 20 mm when all of the data is integrated as described. If bar codes with a pixel size of 0.3 mm can be read in the address reading machine, then the edge length can be reduced to 13 mm.

A subsequent expansion of the specifications to the use of another bar code (e.g. Aztec) with the same data contents is possible.

A preferred embodiment of the layout and of the positioning of the individual elements of the postage indicium is shown by way of an example below in FIG. 5.

The "most critical" dimension is the height of the depicted window of a window envelope that measures 45 mm×90 mm in size. Here, a DataMatrix code with an edge length of about 13 mm is shown which, when the proposed data fields are used, is only possible with a pixel resolution of 0.3 mm. In terms of the available height, a code with an edge length of 24 mm does not leave sufficient space for information about the address.

Printing Quality and Readability

The flawless imprint of the postage indicium is the responsibility of the producer of the customer system within the scope of the approval procedure as well as the responsibility of the customer during the subsequent operations. For this purpose, the customer should be provided with suitable information in a user's manual and in a help system. This applies especially to the aspects of neatly adhering the labels and to preventing (parts of) the postage indicium from shifting outside of the visible area of window envelopes.

The machine-readability of postage indicia depends on the printing resolution used as well as on the contrast. If colors other than black are going to be used, then the reading rate can be expected to be lower. It can be assumed that the requisite reading rate can be met if a resolution of 300 dpi (dots per inch) is used in the printer along with a high printing contrast, this corresponds to about 120 pixels per centimeter.

Test Imprints

The customer system has to be capable of creating postage indicia whose appearance and size match valid postage indicia, but that are not intended for mailing but rather for test imprints and fine adjustments of the printer.

Preferably, the customer system is configured in such a way that the test imprints can be distinguished from actual postage indicia in a manner that the postal service provider can readily recognize. For this purpose, for example, the words "SAMPLE—do not mail" can be printed in the middle of the postage indicium. At least two-thirds of the bar code should be rendered unrecognizable by the words or in some other manner.

Aside from real (paid) postage indicia, except for specially marked test imprints, no blank imprints may be made.

Requirements of the Customer System

Basic System

Overview and Functionality

The basic system serves as a link between the other components of the PC franking, namely, the value transfer center, the security module, the printer and the customer. It consists of one or ore computer systems, for example, PCs, that can optionally also be networked with each other.

A representation of the entire system is shown in FIG. 6.

The basic system also ensures the convenient utilization of the entire system by the customer.

Requirements of the Structure and the Security

The basic system preferably has four interfaces:

1. The communication with the value transfer center takes place via the already described accounting interface.
2. Via an interface to the security module, all of the information is exchanged that has to be communicated to the security module (account amount, or loading procedure identification number, mailing-specific data on individual franking operations). Moreover, all data (cryptographically processed data) is exchanged with the security module via these interfaces.
3. The printer is actuated by an interface to the printer.
4. Via an interface to the user or to the customer (Graphical User Interface, GUI), the user must be able to initiate all relevant processes in the most ergonomic manner possible.

Moreover, the following data has to be stored and processed in the basic system:

- user-specific settings/data,
- detailed utilization journals and utilization profiles,
- when SSL is used: interchangeable certificates with which the validity of the SSL certificates can be verified and
- all relevant information about the products and prices of the postal service provider.

Functional Scope and Sequences

The basic system preferably supports the following sequences:

- a first installation with user help,
- user identification, especially vis-à-vis the security module; optionally with different authorizations for loading account amounts and for creating postage indicia,
- optionally, administration of several users,
- user support while loading account amounts (here, support in the reproduction of information that is transmitted by the value transfer center in the form of HTML-coded files),
- user support when problems apse during the loading of account amounts,
- transparent administration of the value amount (account overview) for the user,
- administration of utilization journals, preparation of utilization profiles and transmission of utilization journals or utilization profiles,
- user support in creating and printing out the postage indicium (illustration of a sample of the postage indicium to be printed on the monitor—WYSIWYG),
- plausibility-based payment computation according to service information of the Deutsche Post,
- electronic help system,
- automatic updating of the relevant information about the products and prices of the Deutsche Post in case of changes as well as information for the customer on update that is taking place or has been completed,
- technical prevention of multiple imprints of one and the same postage indicium and
- de-installation of the customer system.

Security Module

Task and Security Level

As a "cryptographic module" as defined in FIPS PUB 140, Security Requirements for Cryptographic Modules, the security module ensures the actual security of the customer system. It consists of hardware, software, firmware or a combination thereof and encompasses the cryptographic logic and the cryptographic processes, that is to say, the administration and application of cryptographic processes as well as the manipulation-proof storage of the value amount. The requirements that the security module must comply with are defined

- in terms of the security standard, by appropriate norms such as, for example, FIPS PUB 140 and
- in terms of compliance with postal standards, by the UPU publication based on FIPS PUB 140 "International Postage Meter Approval Requirements (IPMAR)".

For introduction into and operation in a customer system, a security module has to be appropriately certified as a cryptographic module as set forth in FIPS PUB 140—preferably in accordance with Security Level 3—within the scope of the introduction process.

Processes of the Security Module

For purposes of initialization and for communication with the value transfer center and for deactivation, in addition to the regular operations, the security module should preferably support essentially the following processes, which are described in detail in the back part of the Technical Description Appendix:

- key generation
- issuance of the public key
- certificate storage
- signature generation
- signature verification
- certificate verification
- temporary certificate storage
- asymmetrical encryption
- asymmetrical decryption
- random number generation
- storage of a session key
- storage of two loading procedure identification numbers
- storage of the current register value of the account amounts
- storage of the ascending register value
- user identification
- status output of the validity of the account amounts
- status output of the register value of the account amounts
- hash formation of the mailing-specific data
- reduction of the register values of loaded account amounts
- recording of errors in a journal
- self-test
- deactivation Test Imprints The security module is not used during the test imprint and is consequently not contacted.

Printer

Depending on the specifications of the producer, the printer can be either a commercially available standard printer or a special printer.

The vast majority of today's laser and inkjet printers should fundamentally be suitable for PC franking Printers with a resolution of at least 300 dpi are recommended.

Processes within the Customer System

Sequence of Creating Postage Indicia

Through the customer system, the customer carries out the following partial processes in the creation of postage indicia:

- Set-up of the connection to the security module: a connection to the security module is established via the basic system.

Identification of the user: the user identifies himself/herself to the security module personally with the password/PIN, thereby activating it.

Input of the mailing-specific information: with the assistance of the system, the customer enters the necessary mailing-specification information into the basic system, which transmits the essential data to the security module.

Creation of the postage indicium: the basic system uses the mailing-specific data and the cryptographically processed data from the security module to create a postage indicium.

Recording the creation of postage indicia in the journal: each successful retransmission is recorded in a utilization journal of the basic system. If a customer system is divided into a local component situated at the premises of the customer as well as a central component (e.g. in the Internet), then the utilization journal has to be recorded in the central component.

Termination of the communication connection: once all of the requested postage indicia have been created, the communication connection is terminated once again. When postage indicia are to be created again, the user identification—as described above—has to be carried out again.

Test imprints: As an alternative to this approach, it is possible to allow the user guidance to advance to such an extent that a sample of a postage indicium is depicted on the terminal (WYSIWYG) and a (non-valid) test imprint can be printed out. Here, only in a later stage would the above-mentioned process of incorporation of the security module take place.

The use of the technical system is complemented by practical organizational measures so that a multiple mailing of a postage indicium, which can be technically registered, is also viewed as a violation of the terms and conditions of the sender.

Furthermore, it is advantageous to provide suitable technical parameters for printing out the postage indicia, especially in terms of the printing quality, so that the postage indicia can be better read in automatic reading devices.

Suitable quality assurance systems, especially according to the ISO 9001 ff. standards, can be used as the basis for checking the system.

The invention claimed is:

1. A method for providing mailpieces with postage indicia, comprising providing a customer system which interacts with a customer to regulate a loading and a storing of account amounts of the customer;

generating and storing by a security module of the customer system a random number;

combining and encrypting by the security module the random number and an identification number of the security module transmitting by the security module the encrypted random number and identification number of the security module to a value transfer center;

decrypting by the value transfer center the encrypted random number and the identification number of the security module;

assigning by the value transfer center the identification number of the security module to the customer in a postage application database;

forming by the value transfer center a loading procedure identification number that contains the identification number of the security module and an actual account amount of the customer;

encrypting by the value transfer center the decrypted random number together with the loading procedure identification number transmitting by the value transfer center the encrypted random number and the encrypted loading procedure identification number to the customer system;

forming by the security module, a hash value of a portion of the mailing data, the random number and the loading procedure identification number;

creating by the customer system a postage indicium using the portion of the mailing data, the encrypted random number, encrypted loading procedure identification number and the hash value;

and printing by the customer system postage indicium which is applied to the mailpieces.

2. The method according to claim 1, including signing in the customer system data with a private key.

3. The method according to claim 2, including storing the private key in the security module.

4. The method according to claim 1, including transmitting data from the customer system to the value transfer center at the time of each request for a monetary amount.

5. The method according to claim 4, including identifying in the value transfer center the customer system on the basis of the transmitted data.

6. The method according to claim 1, including decrypting a part of data by the customer system which contains information about identity of the customer system.

7. The method according to claim 1, including decrypting a part of data by the customer system which contains information about actual monetary amount.

8. The method according to claim 1, including containing in the postage indicium information transmitted by the value transfer center as well as data entered by the user of the customer system.

9. The method according to claim 1, including entering the encrypted random number in the formation of the loading procedure identification number.

10. The method according to claim 1, including transmitting the loading procedure identification number to the security module.

11. The method according to claim 1, including verifying the validity of postage indicia in a mail center.

12. The method according to claim 11, including performing the verification in the mail center by an analysis of data contained in the postage indicium.

13. The method according to claim 11, including forming in a verification station of the mail center a self-generated hash value and checking whether the self-generated hash value matches the hash value and, if it does not match, then registering the postage indicium is registered as being forged.

* * * * *